US009194760B2

(12) United States Patent  
Corder et al.

(10) Patent No.: US 9,194,760 B2  
(45) Date of Patent: Nov. 24, 2015

(54) CAPACITIVE PRESSURE SENSOR WITH REDUCED PARASITIC CAPACITANCE

(71) Applicant: Dwyer Instruments, Inc., Michigan City, IN (US)

(72) Inventors: Rodney Corder, Chesterton, IN (US); Armand E. Gagne, II, Coatesville, IN (US); Justin A. Brown, Grove City, OH (US); Stephen J. Charnley, Indianapolis, IN (US); Ryan Finley, Oak Brook, IL (US); Kyle J. Devlin, West Middlesex, PA (US); Anna B. Wint, Columbus, IN (US); Jenan Almishari, Valparaiso, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 274 days.

(21) Appl. No.: 13/826,339

(22) Filed: Mar. 14, 2013

(65) Prior Publication Data

US 2014/0260690 A1 Sep. 18, 2014

(51) Int. Cl.  
  *G01L 1/14* (2006.01)  
  *G01L 13/02* (2006.01)  
  *G01L 9/00* (2006.01)

(52) U.S. Cl.  
  CPC ............. *G01L 13/025* (2013.01); *G01L 9/0072* (2013.01); *Y10T 29/49007* (2015.01)

(58) Field of Classification Search  
  CPC .................... G01L 9/0072; G01L 13/025  
  USPC .................................... 73/862.626  
  See application file for complete search history.

(56) References Cited

U.S. PATENT DOCUMENTS

| | | |
|---|---|---|
| 4,358,814 A | 11/1982 | Lee et al. |
| 4,823,603 A | 4/1989 | Ferran et al. |
| 5,150,275 A | 9/1992 | Lee et al. |
| 5,442,962 A | 8/1995 | Lee |
| 5,817,943 A * | 10/1998 | Welles et al. ............. 73/718 |
| 6,014,800 A | 1/2000 | Lee |
| 6,019,002 A * | 2/2000 | Lee ............................. 73/724 |
| 6,205,861 B1 * | 3/2001 | Lee ............................. 73/724 |
| 6,456,477 B1 | 9/2002 | McIntosh et al. |
| 6,591,687 B1 * | 7/2003 | Bjoerkman et al. ........... 73/724 |
| 6,886,410 B1 * | 5/2005 | Wang et al. ................ 73/718 |
| 6,901,807 B1 * | 6/2005 | Wang et al. ................ 73/718 |
| 7,073,385 B2 | 7/2006 | Troyer |
| 7,135,749 B2 | 11/2006 | Sakai et al. |
| 7,284,439 B2 * | 10/2007 | Jonsson ....................... 73/724 |
| 7,316,163 B2 | 1/2008 | Grudzien |
| 7,703,329 B2 | 4/2010 | Sekine et al. |
| 8,893,555 B2 * | 11/2014 | Bourbeau et al. ........... 73/717 |
| 2005/0262946 A1 * | 12/2005 | Jonsson ....................... 73/723 |
| 2012/0118067 A1 | 5/2012 | Blankenship |

* cited by examiner

*Primary Examiner* — Freddie Kirkland, III  
(74) *Attorney, Agent, or Firm* — Tarolli, Sundheim, Covell & Tummino LLP

(57) ABSTRACT

System, apparatus and method for capacitive sensing, where a sensor includes an upper and lower housing, each respectively equipped with upper and lower pressure ports. The lower housing is electrically coupled to an active shield. An insulating material is provided on or near a conductive diaphragm for insulating the conductive diaphragm from the lower housing. The insulating material may be an insulator or a dielectric material, where a sensing electrode is positioned such that the sensing electrode extends laterally across at least a portion of the insulating material, and is separated from the insulating material by a predetermined distance to form an air gap.

16 Claims, 2 Drawing Sheets

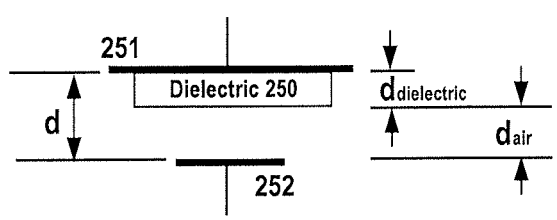
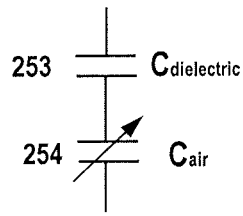
FIG. 2A
FIG. 2B
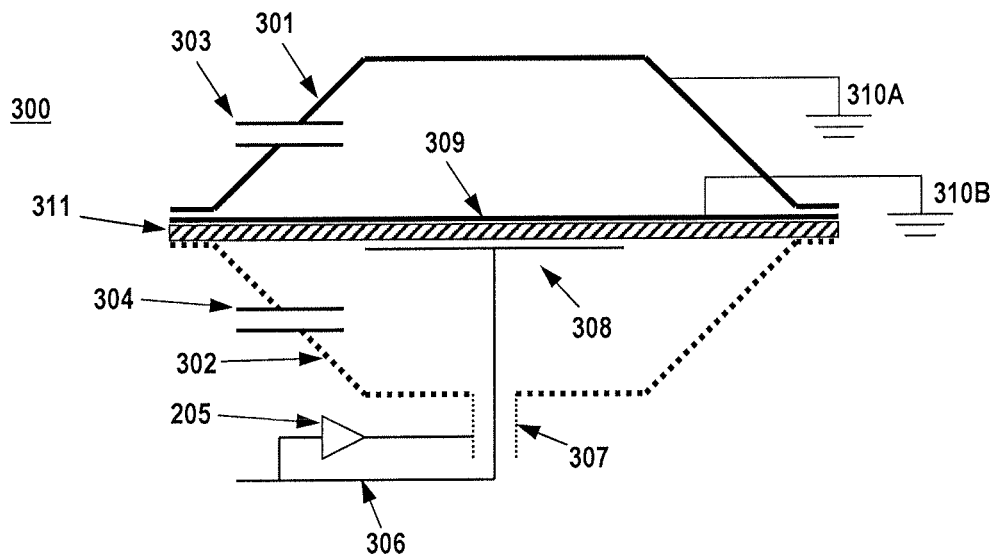
FIG. 3
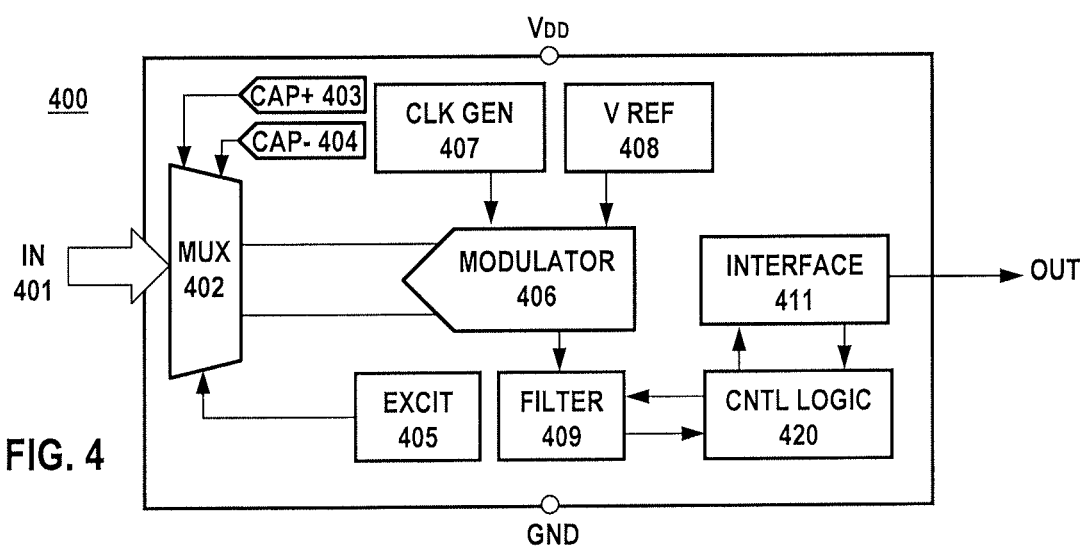
FIG. 4

CAPACITIVE PRESSURE SENSOR WITH REDUCED PARASITIC CAPACITANCE

TECHNICAL FIELD

The present disclosure is directed to techniques for improving operation of sensors. More specifically, the disclosure is directed to techniques for improving operation of capacitive pressure sensors.

BACKGROUND INFORMATION

Sensors have long been used in the art to sense and measure a variety of environmental and/or physical states. Capacitive sensors have been particularly advantageous for having the capability to directly measure a variety of states, such as motion, chemical composition, electric field, etc., and, indirectly, sense many other variables that may be converted into motion or dielectric constants, such as pressure, acceleration, fluid level, fluid composition and the like. Additional applications for capacitive sensors include flow measurement, liquid level, spacing, scanned multiplate sensing, thickness measurement, ice detection, and shaft angle or linear position.

Generally speaking, during a typical design process for a capacitive sensor, electrode plates (or other surface types) use used to measure a desired variable. The capacitance for the plates is maximized by using the largest area allowed for the application, with the plates positioned in a close-space configuration. The sensor is preferably surrounded with appropriate guard or shield electrodes to handle stray capacitance and/or crosstalk from other circuits. Taking into consideration the sensor capacitance, stray capacitance and output signal swing, the sensor may be configure to operate according to a specified transfer function (area-linear, spacing-linear, etc.), and a plurality of balanced capacitors may be used for increased accuracy. The sensor may be further configured to operate at an excitation frequency high enough for low noise. As excitation frequency increases, external and circuit generated noise decreases.

FIG. 1 show an exemplary capacitive pressure sensor 100 as is known in the art. Sensor 100 comprises an upper housing 101 with an upper pressure port 103 and a lower housing 102 with a lower pressure port 102. Both the upper 101 and lower 102 housings may be constructed from stamping, casting, or machining a passivated metal such as stainless steel. The upper and lower housings are separated by a conductive diaphragm 109, and all of them are electrically coupled to a common reference, such as ground (110A-C). A sensing electrode 108 is configured to be positioned separately from diaphragm 109, and is separated therefrom by a small air gap.

During operation, as the relative pressure between the upper cavity and the lower cavity changes, the conductive diaphragm deflects to the side with lower pressure, resulting in a change in the gap between the sensing electrode and the conductive diaphragm. This change causes a change in capacitance between the sensing electrode and conductive diaphragm. By measuring this change in capacitance, the deflection of the diaphragm may be determined, indicating a relative pressure between the upper and lower cavities. Sensing electrode 108 is typically connected to a drive circuit 105 via electrical conductor 106. The electrical conductor 306 is typically shielded with an active shield 107 to protect from stray capacitance, which may comprise an in-phase signal buffered from the drive signal. Since the voltage differential between the electrode conductor 208 and the active shield 107 remain constant, there is no appreciable increase in measured capacitance.

Although the lower cavity 102 is separated from the sensing electrode 108 by a distance that is significantly greater than the distance that the sensing electrode 108 is separated from the conductive diaphragm 209, it has been found that the configuration of the lower cavity contributes parasitic capacitance to the sensing electrode 108. This parasitic capacitance becomes disadvantageous in that it forces a tradeoff between the size of the sensing electrode 108 and base capacitance. The size of the sensing electrode is important in that it affects capacitive change in the sensor, and consequently immunity from noise. Larger sensing electrodes will provide a greater change in capacitance with a given deflection of the conductive diagram. The larger capacitive change, as a result, will provide more noise immunity in the measurement. Accordingly, there is a need in the art to address these and other disadvantages in prior art capacitive sensors

BRIEF SUMMARY

Accordingly, under one exemplary embodiment, a capacitive pressure sensor is disclosed, comprising an upper housing comprising an upper pressure port and a lower housing comprising a lower pressure port, with the lower housing being coupled to an active shield. A conductive diaphragm positioned between the upper and lower housing, and an insulator is positioned in the pressure sensor to insulate the conductive diaphragm from the lower housing. A sensing electrode, preferably positioned in the lower housing, extends laterally across at least a portion of the conductive diaphragm, and is separated from the conductive diaphragm by a predetermined distance.

Under another exemplary embodiment, a capacitive pressure sensor is disclosed, comprising an upper housing comprising an upper pressure port, and a lower housing comprising a lower pressure port, with the lower housing being coupled to an active shield. A conductive diaphragm is positioned between the upper and lower housing, where a dielectric material is coupled to the conductive diaphragm for insulating the conductive diaphragm from the lower housing. A sensing electrode is preferably positioned in the lower housing, wherein the sensing electrode extends laterally across at least a portion of the dielectric material, and is separated from the dielectric material by a predetermined distance to form an air gap.

Under yet another exemplary embodiment, a method of forming a capacitive pressure sensor is disclosed, comprising the steps of providing an upper housing comprising an upper pressure port, and providing a lower housing comprising a lower pressure port, wherein the lower housing is coupled to an active shield. A conductive diaphragm is positioned between the upper and lower housing, and an insulating material is coupled to the conductive diaphragm for insulating the conductive diaphragm from the lower housing, wherein the insulating material comprises one of (i) and insulator and (ii) a dielectric material. A sensing electrode is positioned preferably in the lower housing, such that the sensing electrode extends laterally across at least a portion of the insulating material, and is separated from the insulating material by a predetermined distance to form an air gap.

BRIEF DESCRIPTION OF THE DRAWINGS

The present invention is illustrated by way of example and not limitation in the figures of the accompanying drawings, in which like references indicate similar elements and in which:

FIGS. 2A-B illustrate an exemplary construction and electronic equivalent of sensing capacitive elements under one exemplary embodiment;

FIG. 3 illustrates another exemplary embodiment of a capacitive pressure sensor having a configuration for reducing parasitic capacitance during operation; and FIG. 4 illustrates an exemplary capacitance-to-digital converter for processing signals received from a capacitive sensor.

DETAILED DESCRIPTION

Figure 1:
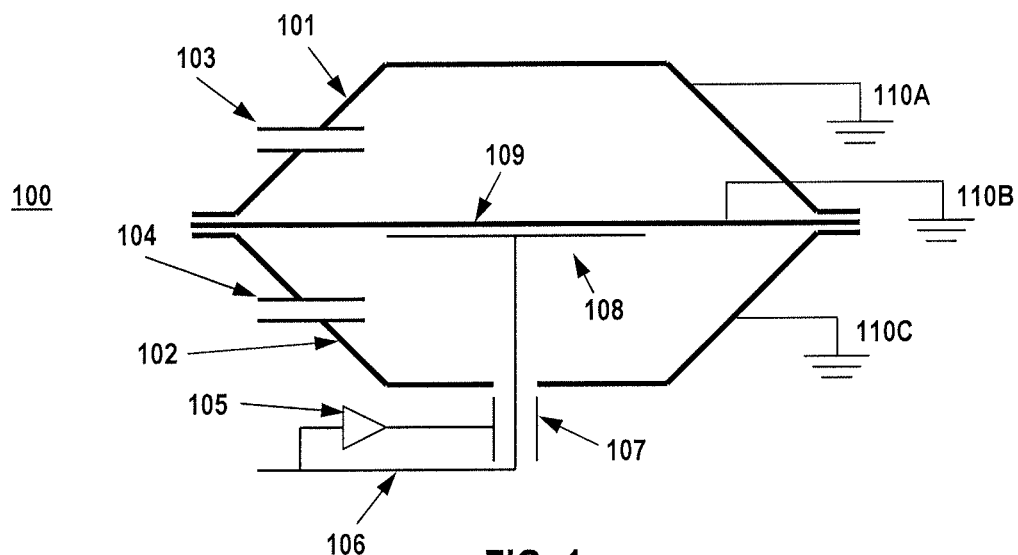
FIG. 1 illustrates a capacitive pressure sensor as is know in the art.
Figure 2:
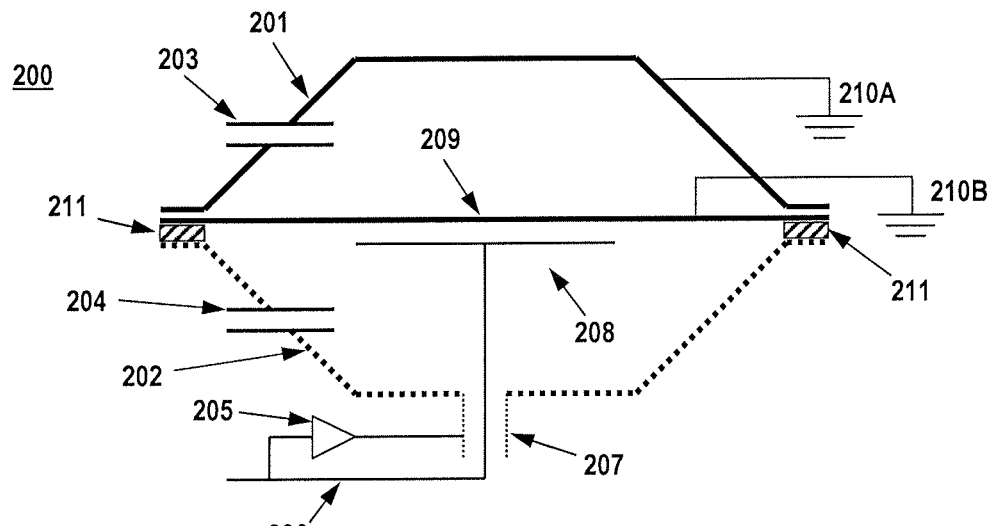
FIG. 2 illustrates one embodiment of a capacitive pressure sensor having a configuration for reducing parasitic capacitance during operation.

Turning to FIG. 2, an exemplary embodiment is provided for a capacitive sensor that minimizes parasitic capacitance between a sensing electrode and conductive diaphragm. Sensor 200 comprises an upper housing 201 with an upper pressure port 203 and a modified lower housing 202 with a lower pressure port 204. Similar to FIG. 1, both the upper 201 and lower 202 housings may be constructed from stamping, casting, or machining a passivated metal such as stainless steel. The upper and lower housings are separated by a conductive diaphragm 209. Here, upper housing 201 and conductive diaphragm 209 are electrically coupled to a common reference, such as ground (210A-B). A sensing electrode 208 is configured to be positioned separately from diaphragm 209, and is separated therefrom by a small air gap.

In the embodiment of FIG. 2, lower housing 202 is modified to be electrically coupled to active shield 207, which minimizes the lower housing from influencing the overall capacitance of sensing electrode 208. In order to allow proper operation, insulator 211 is preferably placed between modified lower housing 202 and conductive diaphragm 209. In order for conductive diaphragm 209 to be connected to a common reference (e.g., ground) ground, it may be mounted to the upper housing 201 in a manner that allows for electrical coupling between them. By connecting the modified lower housing 202 to the active shield 207, the sensing electrode 208 may be placed significantly closer to the modified housing, without being materially affected by the aforementioned tradeoffs associated with parasitic capacitance. Under a preferred embodiment, the modified lower housing 202 is not grounded and is configured such that it does not come in contact with either the conductive diaphragm 209 or the upper housing 201.

The reduced parasitic capacitance for the configuration in FIG. 2 is advantageous not only for the sensor itself, but also to any surrounding circuitry. Typically, a capacitive sensor is operatively coupled to a capacitance-to-digital (C/D) converter, which operates to convert the output of a capacitance sensor into a form usable by a microcontroller. In nearly all cases, the ability of the converter to resolve very low capacitances is limited by the overall capacitance of the sensor, which may include the capacitance of the sensing electrode to conductive diaphragm, as well as the parasitic capacitance between the sensing electrode and lower housing. Generally, if the overall capacitance is lower, the ability to measure at higher resolutions becomes possible.

While the embodiment provided uses an insulator for advantageous effect, similar results may be obtained from using dielectric materials as all. This effect is exemplified in the embodiment of FIG. 2A, which illustrates a physical construction of sensing capacitive elements, comprising substantially parallel disks 251, 252, separated by air and dielectric 250. Here, the capacitance for the disks of FIG. 2A may be expressed as $$C = \frac{\varepsilon_0 \varepsilon_r \pi r^2}{d},$$

where C is capacitance (farads), and $\varepsilon_0$ is the vacuum permittivity, (also referred to as permittivity of free space or electric constant), which is an ideal, (baseline) physical constant containing the value of the absolute dielectric permittivity of classical vacuum. Its value is generally expressed as $\varepsilon_0 = 8.854 \times 10^{-12}$ farads per meter (F/m). $\varepsilon_r$ is the relative permittivity of the dielectric (250); as an example, $\varepsilon_0 = 1.0006$ for air, and $\varepsilon_0 = 3.4$ for polyimide. r is the radius of the disc in meters, while d is the separation (distance) between the faces of the discs. Regarding design considerations, by maintaining a very small distance (d) of separation between the faces of the disks, and arranging radii $r_{diaphragm} > r_{electrode}$, the modified lower housing connected to the active shield minimizes fringing effects on the edges of the discs to the point that they may be ignored, and $r_{electrode}$ may be used for the disc radius. The specific distance used for d would then largely depend upon a tradeoff between sensitivity to manufacturing tolerances and sensitivity to conductive diaphragm deflection.

For a conductive diaphragm with a dielectric, the electronic equivalent combination may be treated as two capacitors in series, as shown in FIG. 2B. Here, the dielectric capacitance $C_{dielectric}$ acts as a constant 253, having the characteristics $$C_{dielectric} = \frac{\varepsilon_{dielectric} \varepsilon_0 \pi r^2}{d_{dielectric}}.$$

The air capacitance $C_{air}$, acts as a variable capacitor 254, having the characteristics $$C_{air} = \frac{\varepsilon_{air} \varepsilon_0 \pi r^2}{d_{air}}.$$

Accordingly, the total capacitance may be expressed as $$C_{total} = \frac{(C_{dielectric} + C_{air})}{(C_{dielectric} \times C_{air})}.$$

As such, it can be noted that the capacitance of $C_{dielectric}$ does not change with deflection of the diaphragm; only the capacitance of $C_{air}$ changes.

An alternate configuration for capacitive sensor 300 is illustrated in FIG. 3, where, similar to the embodiment in FIG. 2, an upper housing 301 is provided with an upper pressure port 303, and a modified lower housing 302 with a lower pressure port 304. Again, upper housing 301 and conductive diaphragm 309 are electrically coupled to a common reference, such as ground (310A-B). A sensing electrode 308 is configured to be positioned separately from diaphragm 309, and is separated therefrom by a small air gap. Sensing electrode 308 is connected to a drive circuit 305 via electrical conductor 306.

In this embodiment, dielectric material 311 may be bonded to conductive diaphragm 309 in order to provide insulation between modified lower housing 302 and conductive diaphragm 309. In one exemplary embodiment, a pre-coated diaphragm assembly may be manufactures by bonding a polyethylene terephthalate (PET) or polypropylene (PP) film to a stainless steel conductive diaphragm. In an alternate embodiment, a conductive diaphragm is built on top of a polymide film (e.g., Kapton) utilizing flex circuit techniques. Generally speaking, circuits may be assembled by mounting circuit elements on flexible plastic substrates, such as polyimide, polyether ether ketone (PEEK) or transparent conductive polyester film. Additionally, flex circuits can be screen printed silver circuits on polyester. These flexible printed circuits (FPC) may be made with a photolithographic technology or similar techniques. An alternative way of making flexible foil circuits or flexible flat cables (FFCs) is laminating very thin (0.07 mm) copper strips in between two layers of PET. These PET layers, which may be 0.05 mm thick, are coated with an adhesive which is thermosetting, and will be activated during the lamination process. In one embodiment, the conductive diaphragm 309 would comprise a plated copper layer bonded to a polyimide film, where the copper would be plated with electro-less nickel and passivated with gold to prevent corrosion. One advantage to this configuration is that the gap between sensing electrode and conductive diaphragm may be minimized without resulting in electrical shorts between the two. As a practical matter, care should be taken so that the dielectric material does not creep over time and allow the modified lower housing to come in electrical contact with either the conductive diaphragm or the upper housing.

As mentioned above, lower overall capacitance allows higher resolution for sensor measurements. Additionally, a lower overall capacitance may negate the need for using customized C/D converters. As an example, certain capacitive sensor elements may have a base capacitance of around 18±2 pF, with a span of ±(2.2±1 pF), yielding an operational range of 12.8 to 23.2 pF. The high base capacitance of such an element would effectively eliminate the use of off-the-shelf C/D converters. A significant portion of this base capacitance can be directly attributable to the effects of parasitic capacitance. For all types of conversion, the ratio of the span capacitance to the base capacitance is an indicator of how well the diaphragm position may be resolved; the closer the ratio approaches 1:2 for a bidirectional sensor, the better the resolution may be for sensing diaphragm position. As a practical matter, a ratio of 1:4 of the span capacitance to the base capacitance will be acceptable given current manufacturing tolerances.

Turning to FIG. 4, an exemplary block diagram for C/D converter 400 is illustrated for receiving signals from a capacitive sensor, such as the ones illustrated above in FIGS. 2 and 3. In one embodiment, C/D converter 400 is configured as a multi-bit (12, 16, 24 bit, etc.) sigma-delta ($\Sigma$-$\Delta$) converter capable of measuring capacitance directly from the device inputs. The architecture should preferably be configured for high resolution and high linearity (±0.01-0.05%). C/D converter 400 may have multiple capacitance input ranges per operation (differential mode/single-ended mode). Input signals 401 from capacitive sensor may be received at a multiplexer 403, operatively coupled to positive terminal (CAP+) 402 and negative terminal (CAP−) 404 of charge-pump circuit. The measured capacitance 401 is connected between an excitation source 405 and the modulator 406 input. A square-wave excitation signal may be applied on the capacitive measurement signal during the conversion and modulator 406 may be configured to continuously sample the charge going through the signal using voltage reference 408 and clock from 407. Digital filter 409 may be configured to process the modulator output (streaming 0's and 1's), where the data from the digital filter 409 is scaled, applying the calibration coefficients via control logic 420, and the final result (OUT) can be read through serial interface 411.

It is understood that the C/D converter of FIG. 4 is merely one non-limiting example, and that a myriad of other suitable C/D converters may be used as well. Additionally, readings from multiple sensors may be combined in a C/D converter using multiple channels. Moreover, the disclosure is not limited to the specific capacitive pressure sensors disclosed herein, but may be applied to any other sensor utilizing the principles disclosed herein.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A capacitive pressure sensor, comprising:
an upper housing comprising an upper pressure port:
a lower housing comprising a lower pressure port, said lower housing being coupled to an active shield;
a conductive diaphragm positioned between the upper and lower housing;
an insulator, positioned in the pressure sensor to insulate the conductive diaphragm from the lower housing;
a sensing electrode positioned in the lower housing, wherein the sensing electrode extends laterally across at least a portion of the conductive diaphragm and is separated from the conductive diaphragm by a predetermined distance, and wherein the conductive diaphragm is electrically coupled to the upper housing.

2. The capacitive pressure sensor of claim 1, wherein the upper housing and conductive diaphragm are electrically coupled to a common reference.

3. The capacitive pressure sensor of claim 1, wherein the sensing electrode is further coupled to a drive circuit via an electrical conductor.

4. The capacitive pressure sensor of claim 1, wherein the upper and lower housings are constructed from one of stamping, casting, and machined passivated metal.

5. The capacitive pressure sensor of claim 1, further comprising a capacitance-to-digital converter, operatively coupled to an output of the capacitive pressure sensor.

6. A capacitive pressure sensor, comprising:
an upper housing comprising an upper pressure port;
a lower housing comprising a lower pressure port, said lower housing being coupled to an active shield;
a conductive diaphragm positioned between the upper and lower housing;
a dielectric material coupled to the conductive diaphragm for insulating the conductive diaphragm from the lower housing; and
a sensing electrode positioned in the lower housing, wherein the sensing electrode extends laterally across at least a portion of the dielectric material and is separated from the dielectric material by a predetermined distance to form an air gap, and wherein the conductive diaphragm is electrically coupled to the upper housing.

7. The capacitive pressure sensor of claim 6, wherein the upper housing and conductive diaphragm are electrically coupled to a common reference.

8. The capacitive pressure sensor of claim 6, wherein the sensing electrode is further coupled to a drive circuit via an electrical conductor.

9. The capacitive pressure sensor of claim 6, wherein the upper and lower housings are constructed from one of stamping, casting, and machined passivated metal.

10. The capacitive pressure sensor of claim 6, further comprising a capacitance-to-digital converter, operatively coupled to an output of the capacitive pressure sensor.

11. The capacitive pressure sensor of claim 6, wherein the radius of the conductive diaphragm is greater than the radius of the sensing electrode.

12. The capacitive pressure sensor of claim 6, wherein the dielectric material, conductive diaphragm and sensing electrode are arranged so that the sensing electrode senses capacitive changes only from the air gap.

13. A method of forming a capacitive pressure sensor, comprising the steps of:
    providing an upper housing comprising an upper pressure port;
    providing a lower housing comprising a lower pressure port, said lower housing being coupled to an active shield;
    positioning a conductive diaphragm between the upper and lower housing;
    coupling an insulating material to the conductive diaphragm for insulating the conductive diaphragm from the lower housing, said insulating material comprising one of (i) and insulator and (ii) a dielectric material;
    electrically coupling the conductive diaphragm to the upper housing; and
    positioning a sensing electrode in the lower housing, such that the sensing electrode extends laterally across at least a portion of the insulating material, and is separated from the insulating material by a predetermined distance to form an air gap.

14. The method of claim 13, further comprising the steps of electrically coupling the upper housing and conductive diaphragm to a common reference.

15. The method of claim 13, further comprising the step of coupling the sensing electrode to a drive circuit via an electrical conductor.

16. The method of claim 13, wherein the insulating material, conductive diaphragm and sensing electrode are positioned so that the sensing electrode senses capacitive changes only from the air gap.

* * * * *